March 3, 1959   H. D. JUSTICE   2,875,695
SEALED PUMPING SYSTEM
Filed May 16, 1957   2 Sheets-Sheet 1

INVENTOR.
HAROLD D. JUSTICE
BY
ATTORNEYS

INVENTOR.
HAROLD D. JUSTICE

ATTORNEYS

United States Patent Office 2,875,695
Patented Mar. 3, 1959

2,875,695

SEALED PUMPING SYSTEM

Harold D. Justice, Cedar Rapids, Iowa, assignor to Collins Radio Company, Cedar Rapids, Iowa, a corporation of Iowa Application May 16, 1957, Serial No. 659,664

1 Claim. (Cl. 103—43)

This invention relates to hydraulic systems and more particularly to hydraulic pumps.

Prior art fluid systems incorporating pumps therein have had numerous difficulties arising from the nature of the pump. Leaks both in and out, corrosion, and poor life are typical of the problems involved in prior art pumps. For applications such as pumping corrosive liquids, where the motor rotors are sealed within the fluid, excessive complication and consequent high cost result although reasonable life is achieved.

It is an object of this invention to provide a pump which is simple and has no moving parts in itself.

It is a further object of this invention to provide a pump which is adaptable to hermetic operation requiring no seal between moving and fixed parts with pressure gradients thereacross.

It is a further object of this invention to provide a pump which is readily adaptable to the handling of highly corrosive liquids at temperatures up to the Curie point of the magnetic material used.

It is a feature of this invention that magnetic spheres are forced through a helix by a rotating magnetic field to pump a fluid interspersed with the spheres.

Figure 1:
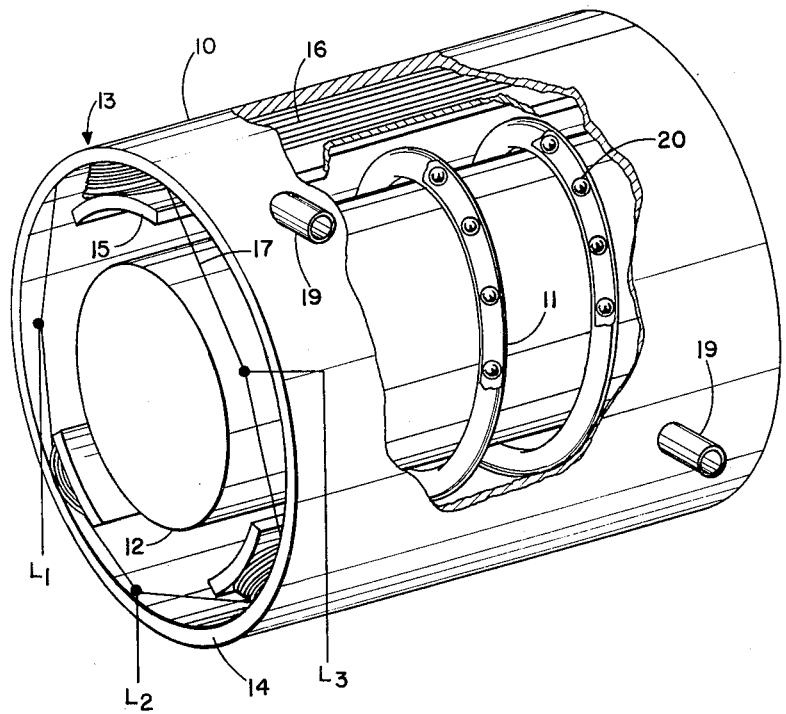
Figure 2:
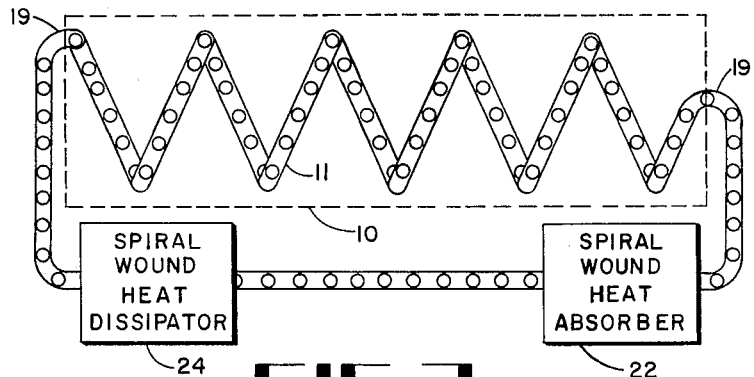
Figure 3:
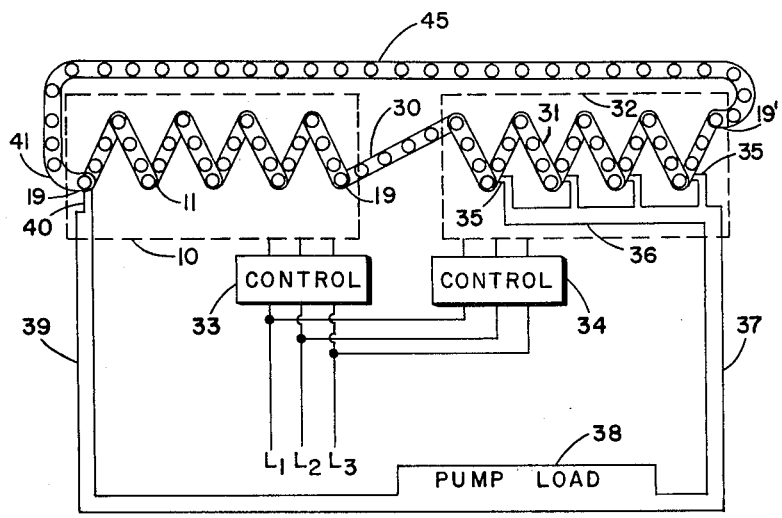

Further objects, features, and advantages of the invention will become apparent from the following description and claim when read in conjunction with the accompanying drawings in which:

Figure 1 shows a partially-sectioned isometric view of the pump in accord with the invention, Figure 2 shows the hydraulic circuit diagram of a simple system using the invention, and Figure 3 shows an improved version of the pump with a section thereof removing the circulating magnetic spheres from the hydraulic circuit.

In the rotary electrical motor commonly available today, rotational energy is developed through the conversion of electrical power into a rotating magnetic field developed in the volume or space inside the motor. The ordinary electrical motor has a stator and a rotor, with the stator excited by alternating current. The stator is wound and excited in such a manner that the volume within the pole faces of the stator has the requisite rotating magnetic field. A rotor is mounted in this magnetic field and by induction or other principles commonly known in the motor art, a torque is developed by the rotor due to reaction with the space rotating magnetic field generated by the stator. The induction principle involves the inducing of a magnetic field in the rotor structure and consequently repulsion between portions of the space rotating magnetic field and this induced field.

In the usual electric motor of today, the pole faces or the inner surfaces of the field generating means are continuous throughout the circumference of the volume. A convenient test for operativeness of the stator under excitation is a small steel ball inserted within the field. If the magnetic field is developed properly, the steel ball will roll around the circumference of the pole faces following a portion of the space rotating field.

In Figure 1 a form of the invention is shown in isometric with a portion broken away to illustrate better the internal arrangement. The pump is formed of three parts, a stator 10, a helical coil of tubing 11, and a magnetic field piece 12.

The stator 10 is shown constructed as the salient pole type. In this form of construction the poles 13 extend inwardly from the frame 14 in a form which is "salient" in nature. There are an appropriate number of poles (three) about the circumference in that the three-phase excitation is utilized in the model illustrated. The number of poles may be varied for different designs. These poles have cores which are mounted on the frame 14. Fanned out pole face portion 15 forms a part of each core. Pole face 15 has a constant radius surface inwardly of the housing 14 to enclose a cylindrical volume. Mounted on the radial portion of the pole is a winding 16 having leads 17 by which the pole is excited electrically. The leads from the poles are connected so as to arrange the windings in delta on the three-phase leads $L_1$, $L_2$, and $L_3$.

A helix 11 of spiral tubing of non-magnetic metal is mounted about the magnetic field piece 12. In the illustration the turns of the tubing are spaced apart for clarity. In actual practice the spiral would be wound with closely adjacent coils. The ends of the spiral tube extend through the wall of the stator 10. Steel balls 20 are mounted within the spiral tube and are interspersed throughout the fluid being pumped. The balls 20 should be capable of moving freely through the spiral tube. The balls, in their transit through the pump, must fit very closely to the inside diameter of the helix in high pressure applications, although for low pressure, high volume operation a larger tolerance is permissible.

Helix 11, as stated above, is composed of tubing of non-magnetic properties as for example, aluminum or copper. This is to permit the magnetic flux emanating from the stator to penetrate and traverse the hydraulic passageway established by helix 11. For applications requiring high resistance to corrosion yet providing high strength for high ranges in temperature etc., non-magnetic stainless steels offer very good service. In cases where pressure is not so important, tubing may be made of flexible plastics such as Teflon (polytetrafluoroethylene) and various other plastics as are readily available on the market today.

The system, while operative as described above, becomes considerably more effective with the completion of the magnetic circuit by the inclusion of a central core 12. This core is a cylinder of magnetic material similar in nature to the magnetic material in the pole cores 15. The central core completes the magnetic circuit consisting of the following: the pole 15, the air gap traversing a portion of the helix 11, the central filler plug 12 to the proximity of another pole, the air gap therebetween traversing another portion of the helix, the core of said other pole, and the return through shell 14 back to the first pole 15. Necessarily, shell 14 is also of magnetic material. The inclusion of the central plug 12 shortens the total air gap and thus reduces the magnetic reluctance of the circuit to such a degree that the majority of flux is concentrated in the air gap through helix 11.

A further, vital portion of the pump is the plurality of magnetic spheres 20 passing through the helix within the magnetic field set up by the stator 10. These magnetic spheres are interspersed along in the fluid being pumped and have some arbitrary spacing consistent with the viscosity and compressibility of the fluid. Their size, as stated earlier, is closely related to the internal diameter in order to preserve the necessary pressure rise consistent with manufacturing tolerances. In other portions of the circuit externally of the pump, the tubing may be slightly larger to ameliorate viscous friction losses due to the passage of the magnetic spheres.

The spheres 20 must be made of magnetic material. These spheres may be steel balls such as are used in ball bearings or they may be made of various types of more highly magnetic iron for increased efficiency. Where the balls must be used in corrosive fluids, a magnetic form of stainless steel may be used. In applications where the balls must have high magnetic permeability and yet have corrosion resistance or other characteristics, the magnetic spheres may be formed in concentric layers starting with a central core having the desired magnetic material and coated with metals or plastics of the necessary corrosive resistive characteristics. Also a non-galling coating may be used where the liquid or fluid pumped does not offer sufficient protection to the ball passing through the close tolerances of the helical passageway 11.

In operation, the stator 10 is excited by a three phase voltage applied to the three wire input $L_1$, $L_2$, and $L_3$. This excitation generates, within the volume of the pole face 15, a rotating-in-space magnetic field. As a result of the alternating currents applied to the input lines and their phase relations, this magnetic field sweeps around the circumference of the cylinder at a rate determined by the number of poles and the frequency of the excitation. For the simple form shown, the magnetic field would rotate 60 times per second for 60 cycle per second excitation.

The space rotating field thus generated by the stator magnet sweeps through the volume of the helical passage 11 and drags with it the balls 20 contained therein. Since the balls 20 substantially close the hydraulic passageway, all fluid before each ball is swept along and thereby pumped.

Figure 2 shows an application of the pump of Figure 1. Here the pump is shown in a dashed line box representing the stator 10 with only the helix 11 illustrated. The output connections 19 are connected to an external circuit containing a heat absorber and a heat dissipator. Thus, in Figure 2 a heat transfer system is illustrated wherein a heat absorber 22 absorbs heat from an external heat source, imparts the heat to the liquid which is then pumped through to a heat dissipator 24. Here the heat is removed from the fluid and dissipated to some heat sink, whereupon the fluid and magnetic spheres pass on to the pump for recirculation. Other fluid circuits which have sufficient tolerance for the passage of the magnetic spheres may be used in applications of the pump of Figure 1.

Figure 3 shows a modification of the invention. Here a stator 10 driving a helix 11 is arranged with input and output terminals 19. The output terminal is connected through a line 30 to a second helix 31 wound within a second stator 32. The second stator 32 is formed similarly to stator 10 and is excited similarly.

Electrically, stator 10 has a control box 33 and stator 32 has a control box 34. These controls are utilized to adjust the relative magnitudes of the magnetic field generated by the stators.

One difference is made in the helix 31, however, from helix 11. Here the various turns each have slitted portions 35 for the removal of the fluid pumped. These slitted portions are connected to a manifold 36 which collects substantially all of the fluid between the magnetic spheres. The output of the manifold 36 is a pipe 37.

Outlet 37 is connected to a load 38 for application of the hydraulic power thus generated. The fluid return 39 from the load 38 connects to the input of helix 11. Here a slit 40 extending around a portion of the turn introduces the fluid to be pumped at the point where the magnetic spheres begin to be attracted by the magnetic field of stator 10. Thus, the magnetic spheres at 41 are pulled apart and pick up between them an incremental portion of the fluid to be pumped.

A return path 45 is connected to the output 19′ of helix 31 for carrying the magnetic spheres back to the input at 41 of the pump helix 11.

In operation, the system of Figure 3 circulates the fluid pumped through one circuit and the pumping spheres through another circuit, each circuit having a common portion through the pump and decelerating helices 11 and 31, respectively. The beginning of the pump helix 11 pulls apart the magnetic spheres and sucks in through slit 40 the fluid to be pumped. Interspersed spheres and fluid, now entrained in the pump helix 11, are swept through in accord with the operation as described in Figure 1. The connecting link 30 connects this interspersed mixture of spheres and fluid to a decelerating helix 31 wherein the spheres are again moved through and by a magnetic field.

Since the helix 31 is tapped in a manner to permit the fluid being pumped to escape, the spheres are "decelerated." Thus, the fluid is leaked out of the train at substantially the pressure and velocity found at link 30. The liquid from each turn of the helix 31 is collected in the manifold 36 and made available to the external circuit at the output 37. The fluid then is routed through the external hydraulic circuit such as is illustrated in block form as pump load 38.

The magnetic spheres return to the input section of the pump for a further cycle and the fluid exhausted from the pump load 38 is likewise returned to the input of the pump for a repetition of its cycle. Thus, circulation of the pumping spheres is obviated in applications where they cannot be accommodated yet must be used for this type of pumping.

Although this invention has been described with respect to particular embodiments thereof, it is not to be so limited because changes and modifications may be made therein which are within the full intended scope of the invention as defined by the appended claim.

I claim:

A hydraulic pump comprising first means for generating a rotating magnetic field, first means establishing a helical hydraulic passage, said first magnetic field means producing a magnetic field transverse to said helical means, second means for generating a rotating magnetic field, second means establishing a helical hydraulic passage, said second field means producing a magnetic field transverse said second helical means, the second end of said first helical means being connected to the first end of said second helical means, the second end of said second helical means being connected to the first end of said first helical means establishing a closed circuit for magnetic spheres, a plurality of magnetic spheres enclosed within said circuit, first means tapping said first helix, second means tapping said second helix, said first and said second tapping means being adapted to be connected to an external hydraulic circuit whereby said first and said second magnetic fields circulate said magnetic spheres through their circuit causing a pressure and velocity rise in fluid between said first and said second tapping means.

References Cited in the file of this patent

UNITED STATES PATENTS

| | | |
|---|---|---|
| 1,298,664 | Chubb | Apr. 1, 1919 |
| 2,698,127 | Bowlus | Dec. 28, 1954 |
| 2,698,582 | Vincent | Jan. 4, 1955 |